(12) United States Patent
Dagdelen Uysal et al.

(10) Patent No.: US 9,933,683 B2
(45) Date of Patent: *Apr. 3, 2018

(54) METHOD AND APPARATUS FOR ELECTRONICALLY DISPLAYING INFORMATION

(71) Applicant: Franwell, Inc., Lakeland, FL (US)

(72) Inventors: Dilek Dagdelen Uysal, Lakeland, FL (US); Jeffrey Lane Wells, Lakeland, FL (US); Edward Holcomb, Needham, MA (US)

(73) Assignee: FRANWELL, INC., Lakeland, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/978,234

(22) Filed: Dec. 22, 2015

(65) Prior Publication Data
US 2016/0187757 A1 Jun. 30, 2016

Related U.S. Application Data

(63) Continuation of application No. 14/218,703, filed on Mar. 18, 2014, now Pat. No. 9,217,907, which is a continuation-in-part of application No. 14/216,857, filed on Mar. 17, 2014, now abandoned.

(60) Provisional application No. 61/789,373, filed on Mar. 15, 2013.

(51) Int. Cl.
| | |
|---|---|
| *G02B 26/00* | (2006.01) |
| *G02F 1/167* | (2006.01) |
| *G02F 1/1345* | (2006.01) |
| *G02F 1/01* | (2006.01) |

(52) U.S. Cl.
CPC ............ *G02F 1/167* (2013.01); *G02F 1/0121* (2013.01); *G02F 1/13452* (2013.01)

(58) Field of Classification Search
CPC ..... G02F 1/167; G02F 1/0121; G02F 1/13452
USPC ......... 359/296, 896; 345/107; 347/148, 141; 349/56, 60
See application file for complete search history.

(56) References Cited

U.S. PATENT DOCUMENTS

| | | | |
|---|---|---|---|
| 6,222,513 | B1 | 4/2001 | Howard et al. |
| 7,139,114 | B2 | 11/2006 | Schmitz et al. |
| 7,357,978 | B2 | 4/2008 | Schmitz et al. |
| 7,479,942 | B2 | 1/2009 | Sprague et al. |
| 7,557,983 | B2 | 7/2009 | Schmitz |

(Continued)

FOREIGN PATENT DOCUMENTS

| | | |
|---|---|---|
| CN | 102566190 A | 7/2012 |
| CN | 102929065 A | 2/2013 |

OTHER PUBLICATIONS

International Search Report dated Jul. 29, 2014, for corresponding international Application No. PCT/US2014/030715, in which F1-F2 were cited as "A".

*Primary Examiner* — Tuyen Tra
(74) *Attorney, Agent, or Firm* — Saliwanchik, Lloyd & Eisenschenk

(57) ABSTRACT

Embodiments of the present invention relate to a mass resolving aperture that may be used in an ion implantation system. Embodiments of the present invention relate to a mass resolving aperture that is segmented, adjustable, and/or presents a curved surface to the oncoming ion species that will strike the aperture. Embodiments of the present invention also relate to the filtering of a flow of charged particles through a closed plasma channel ("CPC") superconductor, or boson energy transmission system.

20 Claims, 14 Drawing Sheets

(56) References Cited

U.S. PATENT DOCUMENTS

| | | |
|---|---|---|
| 7,663,582 B2 | 2/2010 | Schmitz et al. |
| 8,018,410 B2 | 9/2011 | Schmitz et al. |
| 2005/0134550 A1 | 6/2005 | Schmitz |
| 2007/0146308 A1 | 6/2007 | Howard et al. |
| 2008/0220685 A1 | 9/2008 | Johnson et al. |
| 2008/0224993 A1 | 9/2008 | Johnson |
| 2012/0320001 A1 | 12/2012 | Gila et al. |
| 2013/0162511 A1 | 6/2013 | Xiao et al. |
| 2014/0111593 A1 | 4/2014 | Wang |

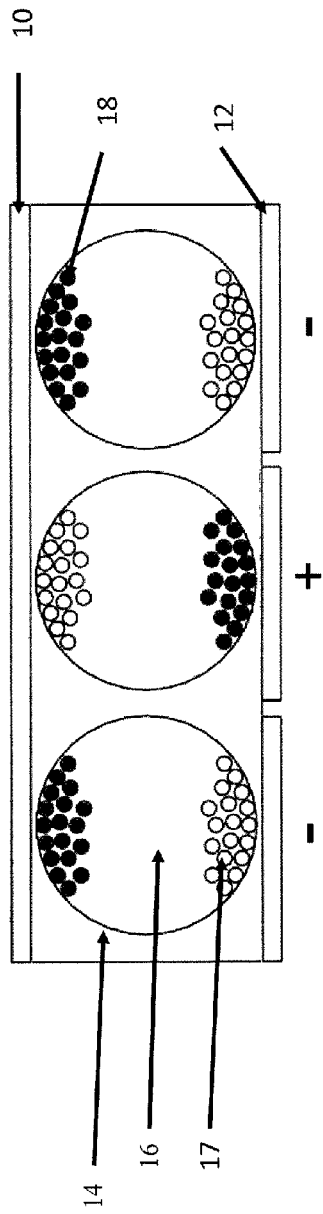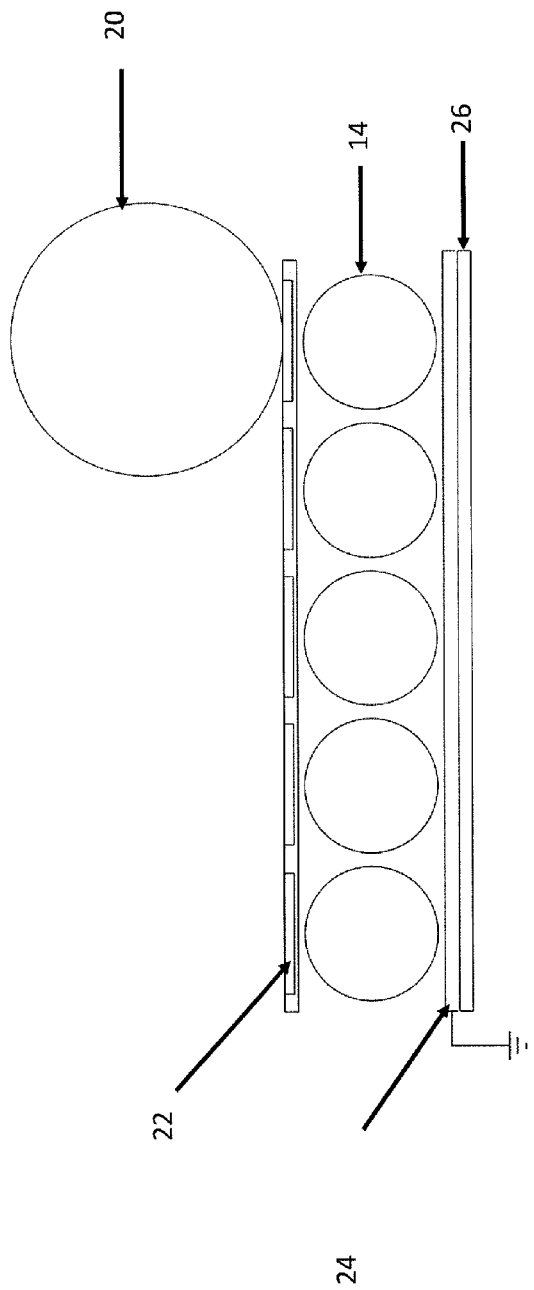

Driver connection to the PCB

METHOD AND APPARATUS FOR ELECTRONICALLY DISPLAYING INFORMATION

CROSS-REFERENCE TO RELATED APPLICATION

The present application is a continuation of U.S. patent application Ser. No. 14/218,703, filed Mar. 18, 2014; which is a continuation-in-part of U.S. patent application Ser. No. 14/216,857, filed Mar. 17, 2014; which claims the benefit of U.S. Provisional Patent Application Ser. No. 61/789,373, filed Mar. 15, 2013; all of which are hereby incorporated by reference herein in their entirety, including any figures, tables, or drawings.

BACKGROUND OF INVENTION

Electronic paper (e-paper), or electronic ink, is display technology that has gained popularity. Unlike conventional backlit flat panel displays, which emit light, e-paper displays reflect light like ordinary paper, making it more comfortable to read. The e-paper surface can also have a wider viewing angle than conventional backlit displays.

Many e-paper technologies can hold static text and images indefinitely without continued use of electricity. The frontplane of the e-paper is the material, or film, that is used to hold the electrically charged pigments and typically incorporates tiny capsules or physical particles that are moved based on the applied electrical filed. The backplane is typically made with thin film transistors (TFTs) that drive the frontplane by the electrical field created on it to attract and distract the pigments. Supporting platform technology, such as a controller, drives the backplane to supply the necessary voltage difference and current based on the image that needs to be generated.

A display with an electrophoretic frontplane forms visible images by rearranging charged pigment particles using an applied electric field. A specific example of an electrophoretic display incorporates titanium dioxide (titania) particles approximately one micrometer in diameter dispersed in a hydrocarbon oil. A dark-colored dye is also added to the oil, along with surfactants and charging agents that cause the particles to take on an electric charge. This mixture is placed between two parallel, conductive plates separated by a gap of 10 to 100 micrometers. When a voltage is applied across the two plates, the particles migrate electrophoretically to the plate bearing the opposite charge from that on the particles. When the particles are located at the front (viewing) side of the display, it appears white, because light is scattered back to the viewer by the high-index titania particles. When the particles are located at the rear side of the display, it appears dark, because the incident light is absorbed by the colored dye. If the rear electrode is divided into a number of small picture elements (pixels), then an image can be formed by applying the appropriate voltage to each region of the display to create a pattern of reflecting and absorbing regions.

These electrically charged particles suspended in a colored oil inside tiny microcapsules. Each microcapsule contains positively charged white particles and negatively charged black particles suspended in a viscous fluid. Instead of microcapsules, microcups can also be used such as SiPix e-paper films.

In the bichromal frontplanes, microscopic plastic beads having two hemispheres with different colors are encapsulated in a pocket of oil. Positively or negatively charged hemispheres rotate freely within the plastic based on the electric field is applied on the e-paper so that negatively charged hemisphere face up with the positively charged electrode, and vice versa. As e-ink does not need to be refreshed like backlit technology, the image stays in place until the next electrical charge. In this way, the display can power down to zero, using less power overall than a display that constantly needs refreshing.

E-paper displays can incorporate active matrix, segmented, and/or passive matrix technologies for their backplanes. An active matrix display typically incorporates a backplane and can have a large array of pixels that each of them is controlled by a Thin Film Transistor (TFT) array. An example of a commercial electrophoretic display is the high-resolution active matrix display used in the Amazon Kindle e-readers. The display is constructed from an electrophoretic imaging film manufactured by E Ink Corporation. Glass is a common substrate that is used to embed these thin film transistors, as glass can withstand the high temperatures needed for the display manufacturing process. The recent development of organic thin film transistor (OTFT), which utilizes lower temperatures during fabrication, allows a plastic substrate to be used for the backplane. Using a plastic substrate for the background enhances the flexibility and durability of the e-paper display, such that flexible e-paper can be manufactured using plastic substrates and plastic electronics for the display backplane.

Retailers typically place items for sale on shelves and place shelf tags on the edge of the shelves to provide potential purchasers information about the items on the shelf Retailers have been seeking a technology for automatically changing the information displayed on the price tags placed on the edges of the shelves. Electronic Shelf Label (ESL) technology allows retailers to remotely change the prices of the items, with or without human intervention. However, implementing ESL with a label for every unique item is often impractical, due to high cost. According to the Food Marketing Institute, a typical grocery store has 38,718 different products on display at a given time, which means that thousands of ESL's per store are needed for the typical grocery to have an ESL for each item. Considering the high price of an individual ESL, ESL technology is not preferred by retailers, especially for low value items.

Accordingly, it is desirable to provide a low-cost, low power-consumption, and durable solution to allow retailers to display information on the shelf edge, and, optionally, automatically update such information.

BRIEF SUMMARY

Embodiments of the subject invention relate to a method and apparatus for electrically displaying information. Specific embodiments pertain to displaying information on shelf edges in a retail setting. Embodiments can provide a low-cost, low-power consumption, and durable solution that allows retailers to display, and, optionally, automatically update, information on shelf edges utilizing e-paper technology and wireless communications. Specific embodiments pertain to an e-paper display without a glass backplane. Further specific embodiments pertain to a flexible e-paper display incorporating a separate driving mechanism that can drive one or multiple e-papers.

BRIEF DESCRIPTION OF DRAWINGS

FIG. 1 shows an example of an e-paper film and the layers of the e-paper.

FIG. 2 shows the roller contact element with the e-paper while it is writing on the e-paper.

DETAILED DISCLOSURE

Figure 3:
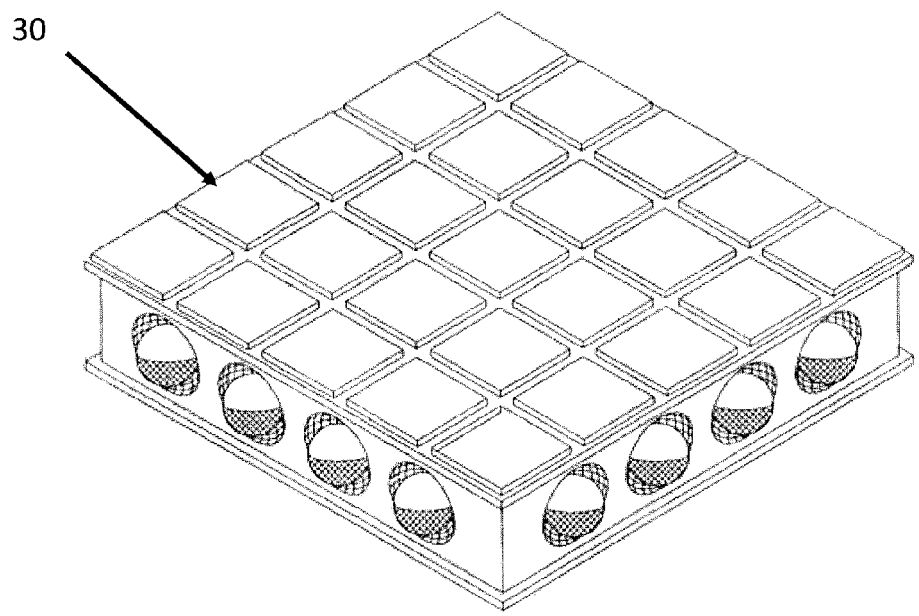
FIG. 3 shows charge retention islands described in U.S. Pat. No. 6,222,513.

Embodiments of the subject invention relate to a method and apparatus for electrically displaying information. Specific embodiments pertain to displaying information on shelf edges in a retail setting. Embodiments can provide a low-cost, low-power consumption, and durable solution that allows retailers to display and automatically update information on shelf edges utilizing e-paper technology and wireless communications. Specific embodiments pertain to an e-paper display without a backplane with transistors. Further specific embodiments pertain to a flexible e-paper display incorporating a separate driving mechanism that can drive one or multiple e-papers.

Embodiments are directed to an electronic display system. Embodiments are also directed to an e-paper driver that can be used in an electronic display. Further embodiments relate to e-paper that does not utilize an active matrix backplane and is, optionally, flexible. Specific embodiments can cover an entire shelf edge with the e-paper display, which can show all the information that a traditional price tag, or shelf tag, shows for each item, and can display additional information on the space between where traditional shelf tags are positioned. As more than half of a typical shelf edge is empty or blank, embodiments can allow the shelf edge to perform as an information and marketing display, which can enhance the customers' shopping experience and generate additional revenue for the retailers.

Various embodiments of the subject e-paper display can be as wide and long as it is required for the display purpose. Specific embodiment for the shelf edge can be 4 feet long and at least one half an inch wide, whereas an embodiment of an advertising display can be 6 feet long and 3 feet wide. Further specific embodiments can be at least one foot long, at least two feet long, at least three feet long, and at least four feet long, and can be at least one half an inch wide, at least three quarters of an inch wide, and at least an inch wide. E-Paper is easy to read, can be read from almost any angle, is lightweight, durable, and available in black and white and/or color.

Various embodiments of the subject display incorporate e-paper utilizing dot matrix, segmented, and/or passive matrix technologies, such as an e-paper described in US2013/0162511. The subject displays can display a variety of information, such as the pricing of the item, various images, animations, and other information. An active matrix display incorporates a backplane and can have a large array of pixels, which can be controlled by a Thin Film Transistor (TFT) array. Glass is a common substrate that is used to embed these transistors for various reasons, such as the fact that glass can withstand high temperatures that are needed for the manufacturing process. The recent development of organic thin film transistor (OTFT), which utilizes lower temperatures, allows a plastic substrate to be used for the backplane. Using plastic brings the advantages of flexibility and durability, which are key features in e-paper technology. Embodiments of the subject invention can utilize a plastic substrate as the backplane, where conductive elements can be incorporated with the plastic substrate such that the conductive elements can have charge by a charge-transfer device applied to them after the charge-transfer device is removed, as described in U.S. Pat. No. 6,222,513, which is hereby incorporated by reference in its entirety. The conductive elements can have any shape and can have dimensions on the order of 10 µm or higher. Specific embodiments have rectangular (e.g., square) shapes with sides having a length in the range 10 µm-50 µm, 50 µm-100 µm, 100 µm-500 µm, and/or greater than 500 µm. However, the process of combining the front plane of the e-paper with the backplane, which drives the ink to the front plane, gets complicated when a flexible material is used for the backplane. The pixels and the TFT array need to be aligned precisely at all times, but flexible material makes this alignment difficult, especially for a big display. Glass substrate provides the rigidness that makes achieving this alignment easier; however, glass substrates are expensive and fragile.

Referring to FIG. 1 as an example, embodiments can have pixels that are comprised of electrically charged particles suspended in a colored oil inside tiny microcapsules 14. Each microcapsule 14 can contain positively charged white particles 17 and negatively charged black particles 18 suspended in a viscous fluid 16. By applying a charge to electrode regions 12 a voltage can be applied from the electrode region 12 to the electrode 10, which is preferably transparent. Further embodiments can use charged pigments or dye in a fluid positioned by the frontplane and the backplane.

Embodiments pertain to a flexible display 50 having a conductive layer, which acts as an electrode, on a first side of the region incorporating the microcapsules, or other structure for displaying an output and a plurality of conductive regions 22 on the opposite side of the region incorporating the microcapsules, which act as electrodes. Specific embodiments do not have a backplane with any type of TFT. Specific embodiments can use a plastic and/or polymer based layer for the backplane. FIG. 2 shows a schematic of an embodiment in accordance with the subject invention. The backplane is controlled by using an e-ink driver 60 that slides with respect to the display 50. In one embodiment, the driver 60 moves along the display similar to, how a print head prints ink on a paper. In another embodiment, the display 50 moves past the driver 60. In other embodiments, some combination of movement of the driver 60 and the display 50 can allow the driver to rewrite the display 50 by sequentially rewriting subsections of the display 50. Such display 50 and driver 60 combinations can provide a low cost solution, using a plastic substrate to also provide durability.

The e-paper driver 60 can communicate with a server or other hardware via wired and/or wireless technologies, such as RF, Zigbee, and/or Wi-Fi. The server or other hardware can provide updates with respect to the information to be displayed on the required areas of the display. A power source 100 can be positioned on the driver 60, the driver 60 can draw power from a stationary unit on the display system, and/or power can be supplied to the driver 60 by other techniques known in the art. In an embodiment, the power source 100 can be an energy harvesting device, a replaceable battery, a rechargeable battery, or an electric outlet.

Figure 4:
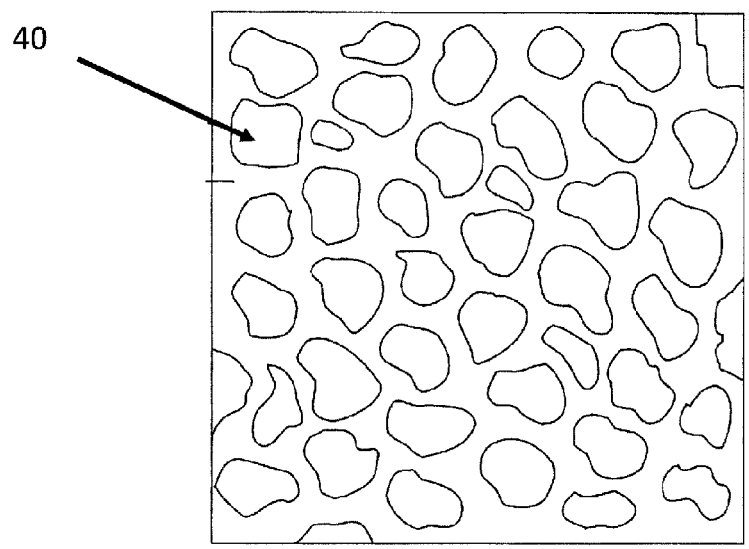
FIG. 4 shows an alternate charge retention islands described in U.S. Pat. No. 6,222,513.

The following are specifications of a specific display device, referred ti as POPedge, incorporating a driver 60 in accordance with an embodiment of the subject invention:

1) POPedge is an e-paper display that covers the entire shelf edge and shows information such as price, description, brand, ID number (like barcode, QR code), availability, location, freshness date, and/or on sale status with respect to the items on, under, or near the shelf, and/or other items.
2) POPedge uses an e-ink driver similar to a printhead to update the information on the front plane eliminating the need for a backplane
3) In a store, an aisle can contain multiple displays. POPedge can either be a modular unit where the display portions 50 can be combined together and one driver 60 can update the whole aisle or each unit can be used as a stand-alone display.
4) The driver 60 can carry the communication module and the power source 100 on the driver 60 or a station located along the edge of the display can control the driver
5) The communication protocol can vary depending on the retailer's infrastructure. Multiple communication technologies can also be enabled on a single POPedge device.
6) Different sources 100 can be utilized to power POPedge. The source(s) can be located on the driver, display, and/or shelf. Examples of power sources 100 that can be utilized include, but are not limited to,
   a) An energy harvesting unit
      i. Solar panels
      ii. RF power harvesting unit
      iii. Motion energy harvesting
   b) A replaceable and/or rechargeable battery on the display
   c) Electricity grid FIG. 2 shows an embodiment utilizing a roller contact element 20 with the e-paper while the roller contact element is in contact with the e-paper, where the e-paper has a protective layer 26, microcapsules 14, conductive regions (or electrode regions) 22, and a conductive layer (or electrode) 24. FIG. 3 shows charge retention islands 30 described in U.S. Pat. No. 6,222,513 and FIG. 4 shows alternative charge retention islands 40 described in U.S. Pat. No. 6,222,513.

Figure 5:
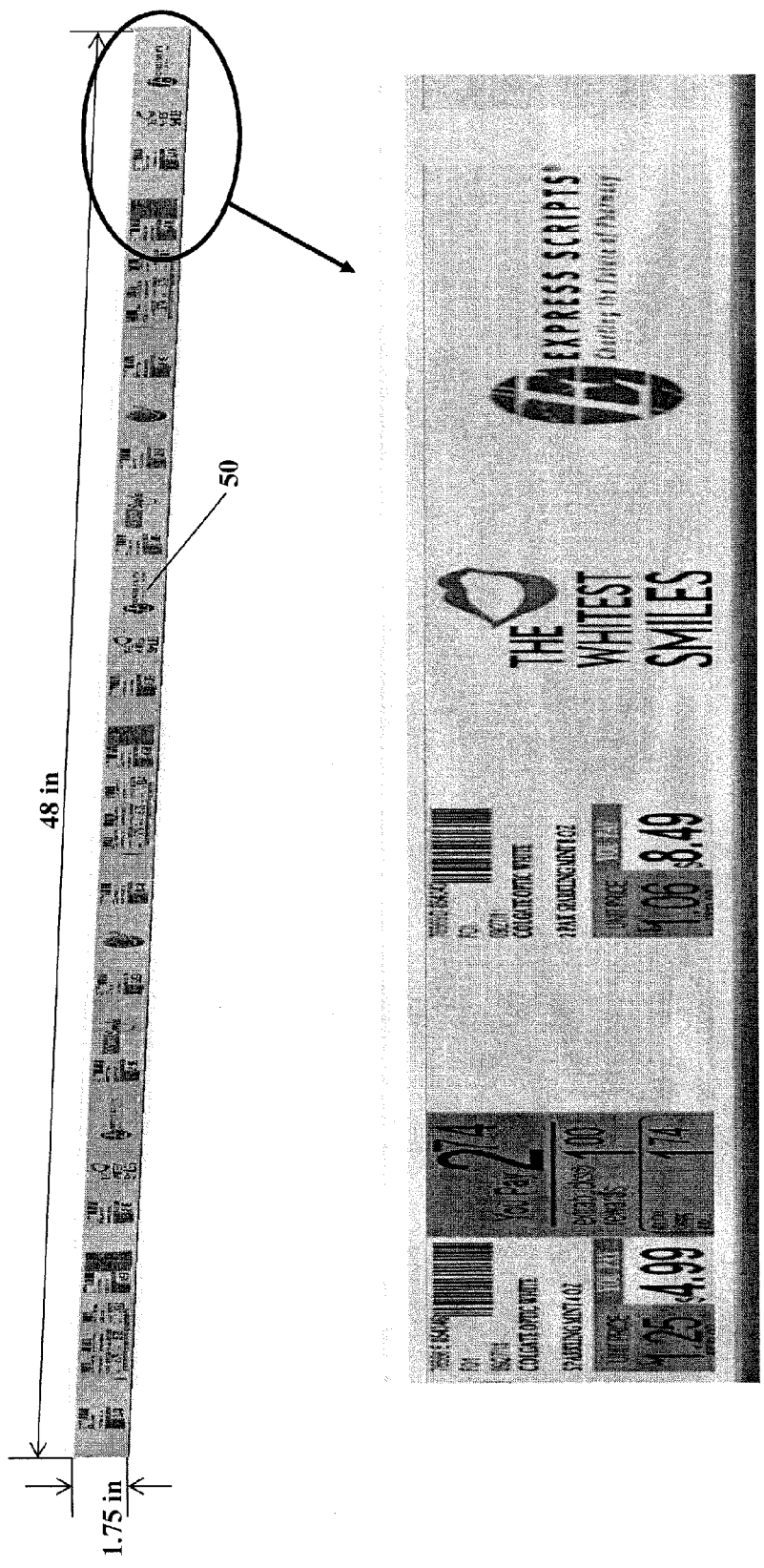
FIG. 5 shows a 48"×1.75" e-paper display in accordance with an embodiment of the subject invention, and an enlargement of a section thereof.

FIG. 5 shows a 48"×1.75" POPedge display in accordance with an embodiment of the subject invention, and an enlargement of a section thereof. The display shows the pricing as well as any promotion information, advertisements, or additional information about the products.

Figure 6:
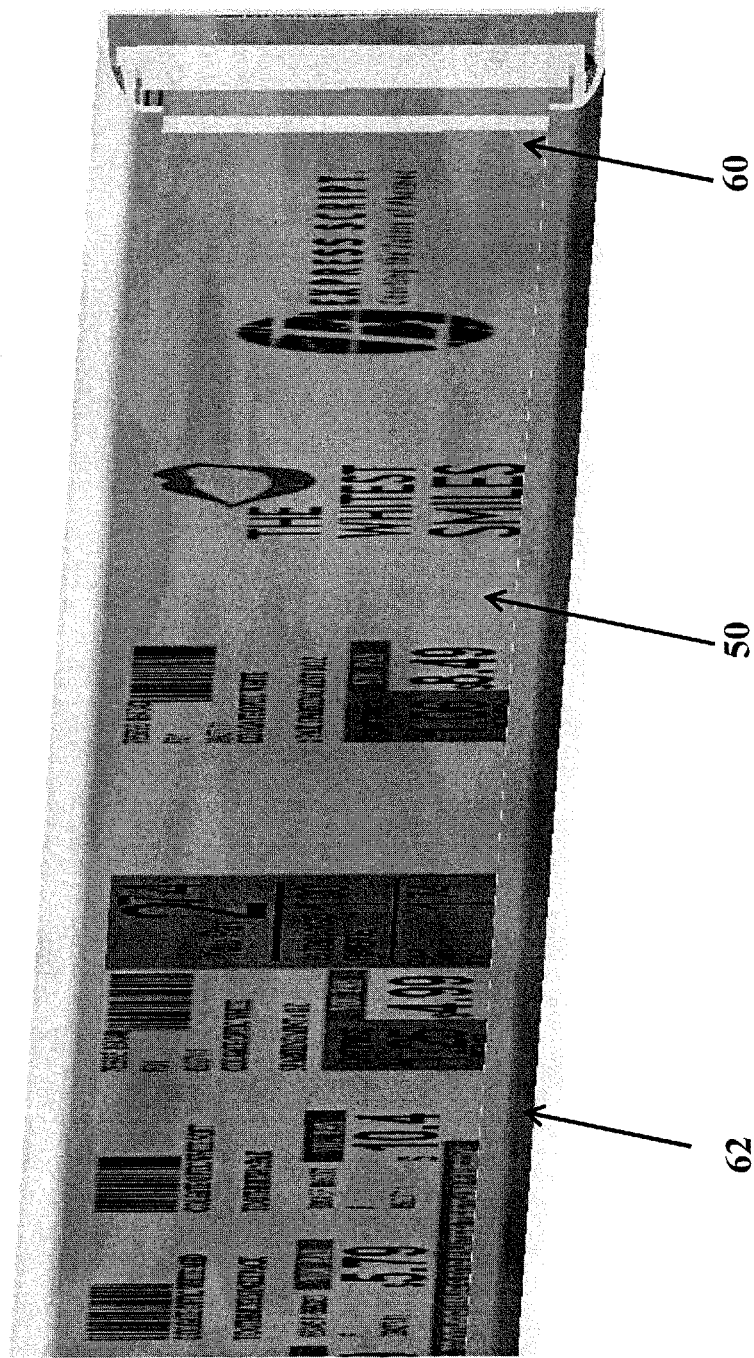
FIG. 6 shows the arrangement of the shelf attachment/display holder, the e-paper display, and the driver.
Figure 7:
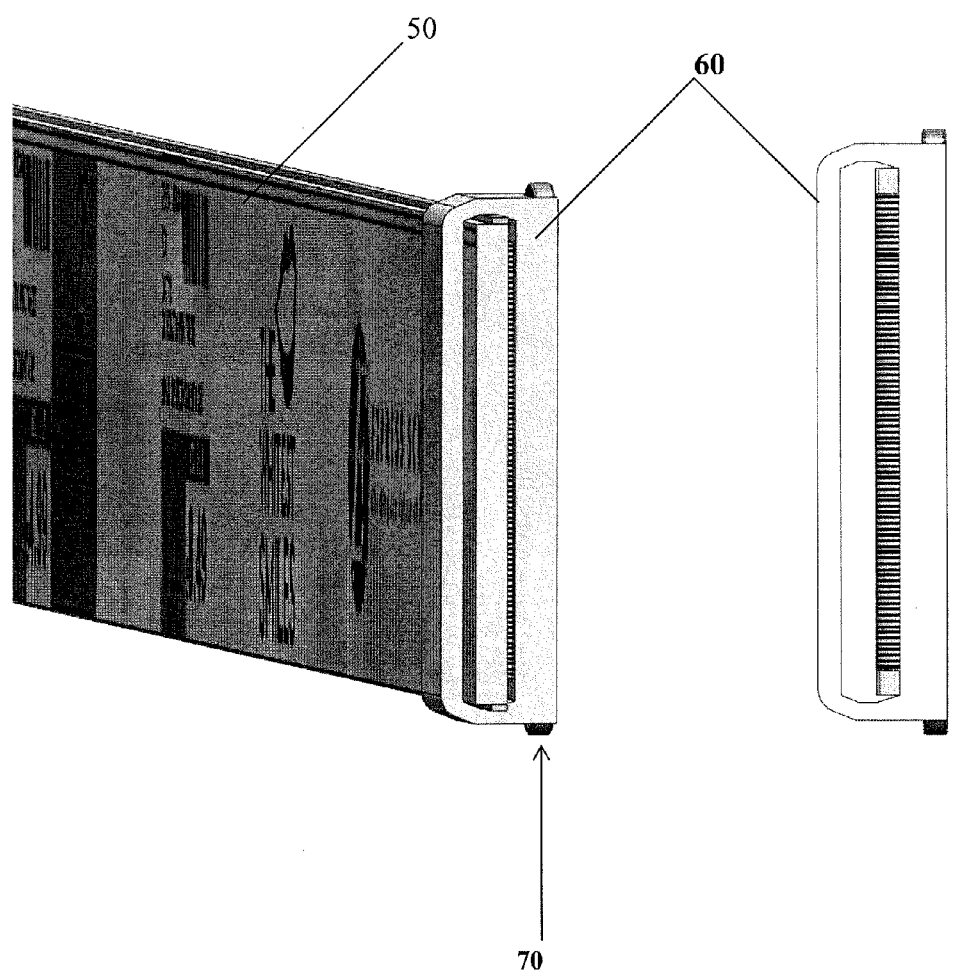
FIG. 7 shows two views of an embodiment of the subject invention, showing the manner in which the driver surrounds the e-paper and the wheels attached to the driver enable it to move the e-paper from side to side and/or move along the e-paper.

FIG. 6 shows the arrangement of the shelf attachment/display holder 62, the E-paper display 50, and the driver 60. In this embodiment, the driver 60 surrounds the e-paper 50, as shown in FIG. 7. In alternative embodiments the driver does not need to surround the e-paper 50 (e.g., a transparent front surface could be used in the display and the driver could couple with the display to provide the force needed for good contact). The display 50 is sufficiently flexible to allow sufficient, and preferably absolute, contact between the conductive elements and the front plate, for sufficient periods of time to effect charge transfer, and preferably at all times. The driver wheels 70 attached to the driver 60 enable the driver to move across the e-paper 50 from side to side by pushing off of the display. In alternative embodiments the driver wheels could push off of the e-paper, or off of the back of the display such that the back of the display pushing on the wheels provides good friction with the wheels and a force to encourage contact between the e-paper and the driver. Alternative embodiments can have a mechanism in the display that moves along the display and the driver can attach to the mechanism to be moved. Embodiments can drive the driver wheels 170 and allow the roller element 20 to rotate freely, drive the driver wheels 70 and the roller element 20, or use some other drive mechanism, for example interconnected with the shelf to move the driver. Further embodiments can have the driver move by rotating the roller element 20 and have the friction between the roller element 20 and the display 50 propel the driver. One of the biggest problems previous apparatus have had is the friction between the conductive element and the E-paper causing the conductive element(s) to wear out. Embodiments of the subject device incorporating an encapsulating loop can maintain the pressure between the driver's conductive element(s) and the e-paper's conductive elements at an optimum level, such that proper electrical connection is made without friction causing the conductive elements to prematurely wear out.

Specific embodiments can incorporate one or more rotating elements, such as roller elements 20, to contact the electrode regions on the backplane. Embodiments with a rotating element can avoid, or essentially avoid, a sliding motion between the electrode regions of the backplane and the conductive element of the contact element, which transfers charge to and/or from the electrode regions on the backplane. Instead, the rotating element comes into contact by approaching the backplane and then being lifted from the backplane.

Figure 8:
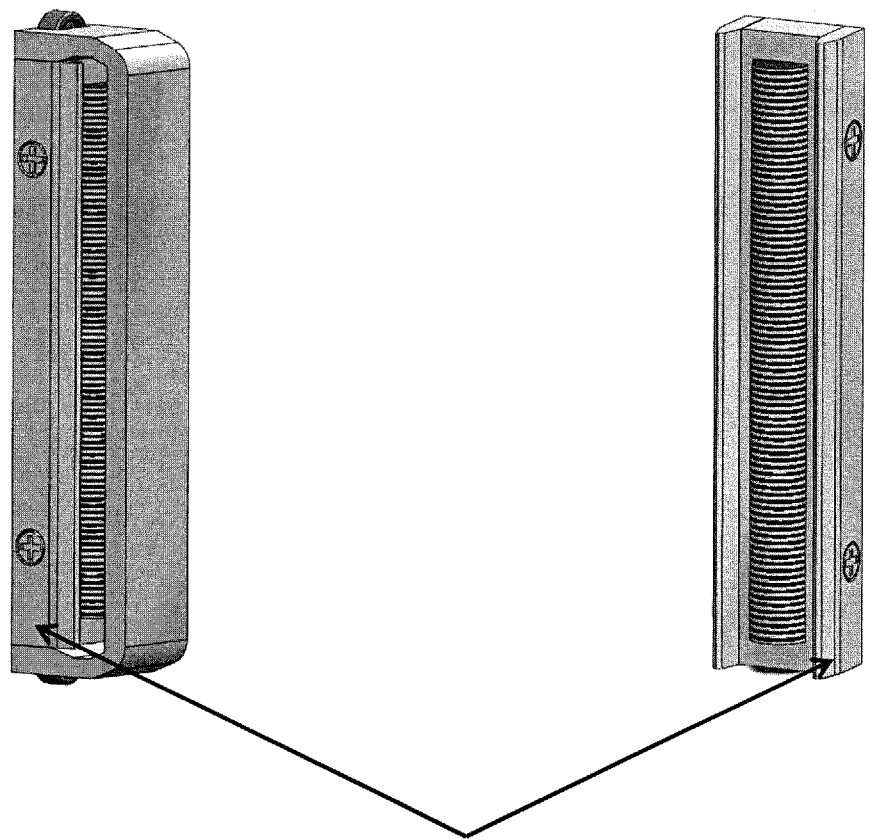
FIG. 8 shows the manner in which the wiper attached to the driver can support the front panel of the driver for encapsulation.

The wipers 80 attached to the driver can support the front panel of the driver 60 for encapsulation, as shown in FIG. 8. The wipers can be made of metal or can be made of a non-conductive material having a portion made of metal that moves up and down and be used to erase the information on the pixels. The wipers 80 can be placed on both sides such that the driver 60 will update the e-paper 50 while moving from either side. Alternatively, a single wiper can be used. The wipers 80 can also sweep any dust on the e-paper to provide better contact between the driver 60 and the e-paper 50. The supporting wipers 80 can support the e-paper 50 to be held between the plates and the second portion of the driver 60. In this way, any wrinkled areas of the e-paper that can affect the intactness of the contact due to the flexibility of the e-paper can be smoothed out.

The wipers can be electrically connected to the PCB or other charge source to provide the wipers with charge to change to e-paper pixels to light, the change the e-paper pixels to dark, or to change the e-paper pixels to some other desired pattern. The wipers can be moved into a first position where contact is made with the e-paper and moved into a second position where contact is not made. In specific embodiments, the e-paper can be erased by the contact element, either while writing on the display, or in a separate run. Another specific embodiment can use two cylinders, one as a wiper and one to write, or the two cylinders could alternate between erasing and writing depending on the direction of the driver.

Figure 9:
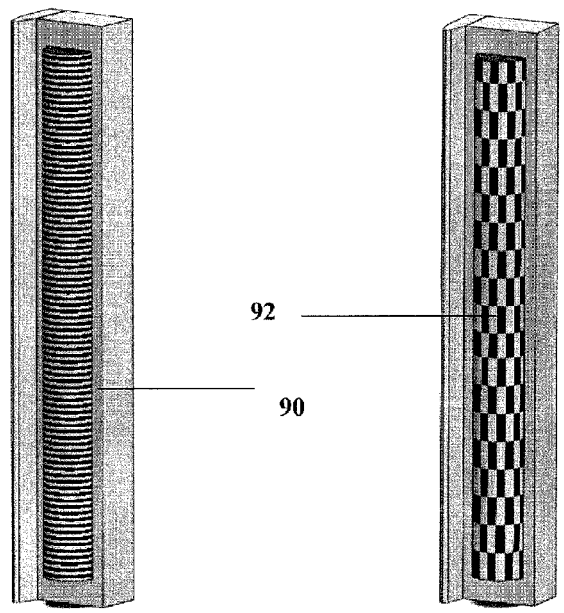
FIG. 9 shows two embodiments of the subject invention in which the conductive element that transfers charge to the e-paper is a roller, having a cylindrical element with different conductive/non-conductive patterns.
Figure 10:
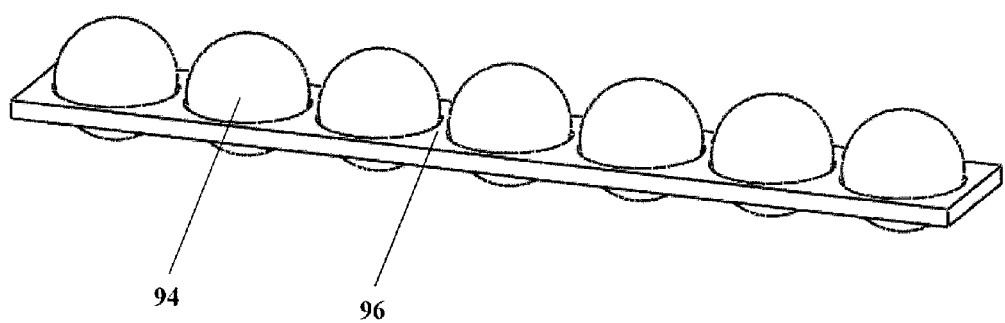
FIG. 10 shows two embodiments of the subject invention in which the conductive element that transfers charge to the e-paper is a roller, having a conductive beads and non-conductive areas in between the conductive beads.

The conductive element that transfers charge to the e-paper (the conductive regions 22 on the e-paper) can have a variety of shapes. In one embodiment, the contact element can be a roller covered with conductive material and non-conductive material positioned in a sequence, as shown in FIG. 9 and FIG. 10. The roller can be made of a Zebra stripe 90 cut in a cylindrical shape, a film that has conductive and non-conductive areas 92 and rolled over a cylinder, or with conductive and non-conductive materials layered on top of each other and cut through with a cylindrical cutter or small beads 94 lined up together separated with non-conductive element 96. Each conductive strip, or conductive area, can be controlled by a transistor or a driver IC attached to (or touching) the PCB inside the driver. Alternatives to the PCB can be used to provide the charge needed, for transfer by the contact element. Different patterns on the roller can be chosen, but the pattern 90 on the left in FIG. 9 can be easier to implement. Instead of a roller, sweeping components known in the art can be used.

The roller with zebra stripe 90 pattern has conductive elements that form parallel rings around the circumference of the roller element. Specific embodiments can have the roller contact element roll across the e-paper such that the rings make contact with the electrode regions 22 of the e-paper while the charge source is in contact with the rings, such that charge is transferred. As an example, a PCB can have m electrodes that are in contact with n ring electrodes on the roller element and can selectively provide charge to p electrode regions on the e-paper, where m, n, and p are integers. In specific embodiments, m=n, m<n, n=p, n<p, m=p, m<p, m=n=p, m=n<p, m<n=p, m<n<p, and/or other permutations. In another embodiment, such as the roller having the pattern 92, where the conductive elements on the roller element 20 are not in contact with each other, the charge can be transferred onto a first roller element conductive element when the first conductive element is not in contact with the e-paper, such as by contacting the first conductive element by the PCB, and then at a later point in time, the first conductive element can control an electrode region of the e-paper and transfer the charge. The width of the rings, or pattern electrode elements, on the roller elements can be such that each ring only transfers charge to no more than a certain number of electrode regions, or touches at least a certain number of electrodes, in the dimension of the width. The diameter of the roller element can be such that only a certain number, or at least a certain number, of electrode regions of the e-paper are contacted at one point in time, and the dimensions of the electrode regions can be selected based on desired resolution and/or other concerns. In specific embodiments, the diameter of the roller element can be in a range 0.1 mm-0.5 mm, 0.5-1 mm, 2-3 mm, 3-4 mm, 4-5 mm, 5-6 mm, 6-7 mm, 7-8 mm, 8-9 mm, 9-10 mm, 1-10 mm, 10-20 mm, 20-30 mm, 40-50 mm, 50-100 mm, and/or greater than 10 cm. In specific embodiments, the width of the ring or patterned conductive elements can be in the range 10 µm-100 µm, 10 µm-50 µm, 50 µm-100 µm, and/or greater than 100 µm. Preferably the width of rings 90, or patterned conductive element 92, in less than or equal to the dimension of electrode region 22. In an embodiment, the charge transfer electrode, e.g., PCB electrode can be in the range less than 1 µm, 10 µm-50 µm, 50 µm-100 µm, and/or greater than 100 µm. In a specific embodiment, the diameter of the roller element is 5 mm, the electrode regions 22 are 100 µm by 10 µm and the rings 90 are in contact with approximately 9, 10, 11, 12, or 13 electrode regions 22 at a time. As the roller element rolls over the e-paper the PCB can change the voltage applied to the electrode regions 22 every 0.1 sec. The speed of the driver can be selected such that the roller is in contact with a new 9-13 electrode regions each time the PCB changes voltage, giving a resolution of 0.9 mm-1.3 mm. Of course, these parameters can be adjusted.

Figure 11:
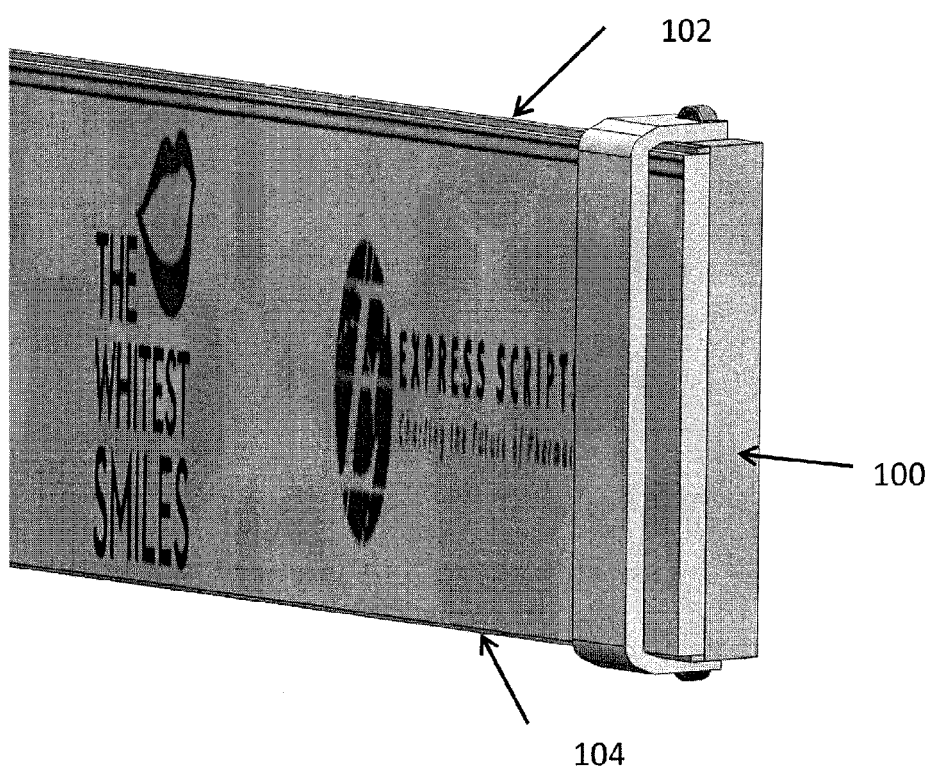
FIG. 11 shows the positions of two conductive plates embedded to the front plate and a power source located on a side of the display.

Two conductive plates 102 and 104 can be embedded into, or otherwise interconnected to, the front plate, as shown in FIG. 11. These plates can deliver power to the driver. The driver can get power from a power source 100 located on the shelf, the display's sides, or other convenient location. Having the power supply positioned at a location other than the driver can decrease the weight of the driver, and increase the energy efficiency and speed of the driver. The driver may carry the power source on the driver, depending on the power consumption and the type of power required. As an example, if a power harvesting apparatus is used, the power unit required may be so small that the power unit can be located on the driver.

The conductive plates 102 and 104, or other conductors such as wires, can provide a DC voltage to power the driver, to drive the charge source (e.g., PCB), power optional wheels 70, optionally power a motor or other device to rotate the roller element, or other device to move the driver.

Figure 12:
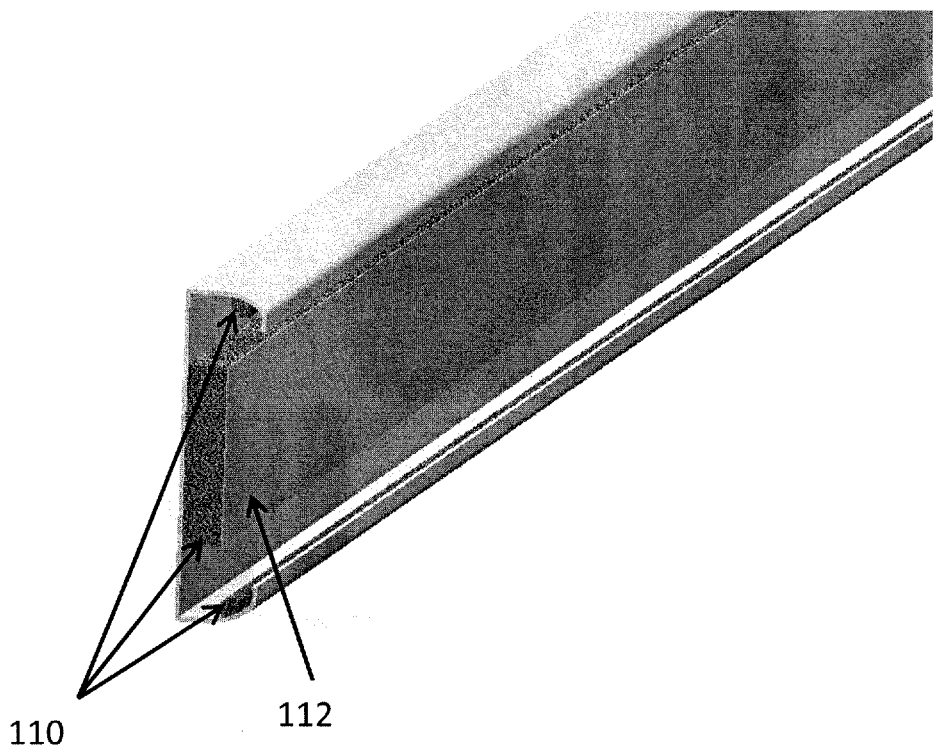
FIG. 12 shows the foam with a thin plastic layer on top which can support the holder and allows the driver to slide over the surface more easily.
Figure 13:
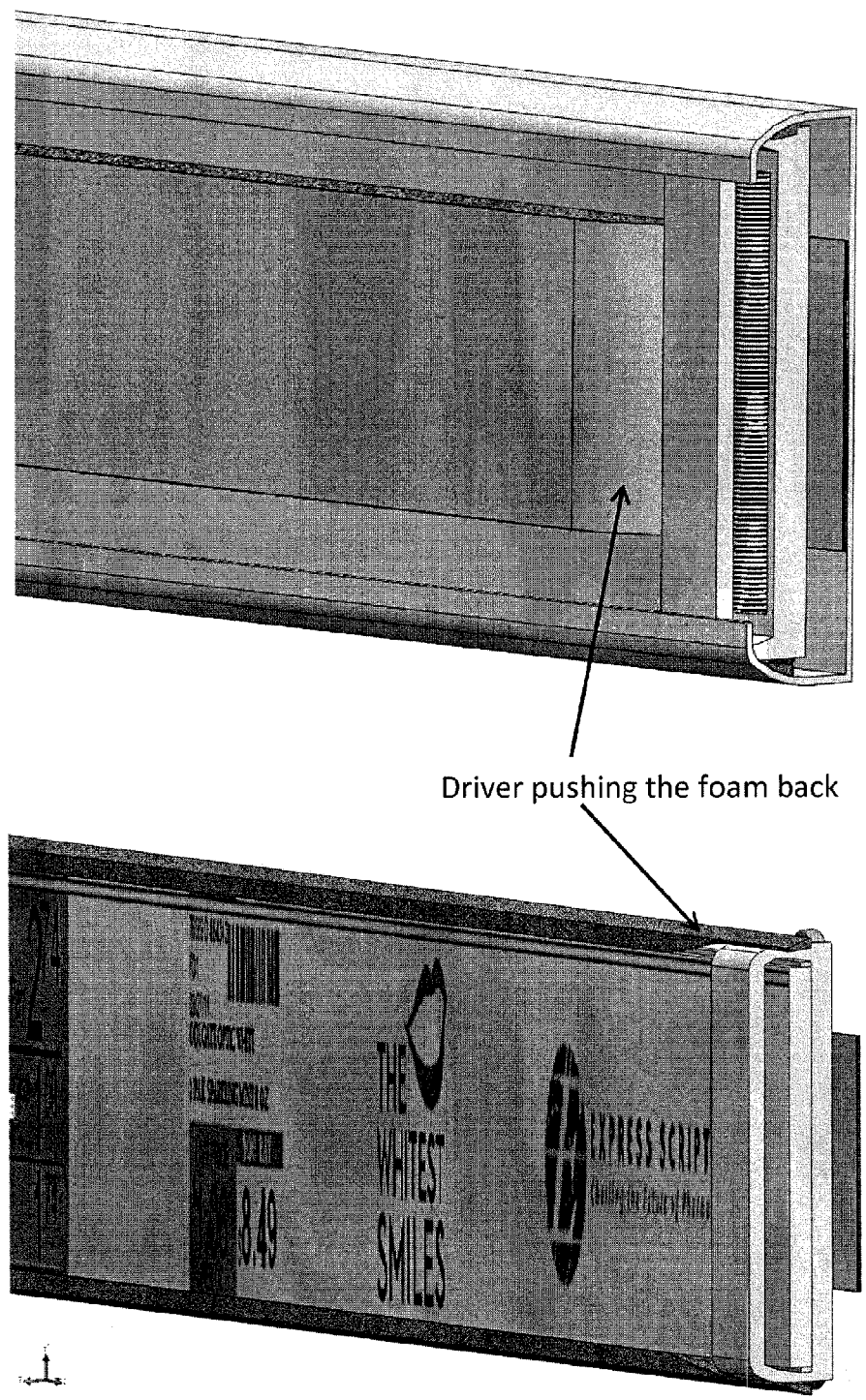
FIG. 13 shows how, when the driver moves, the driver can push the foam back and create a cavity for easier movement.
Figure 14:
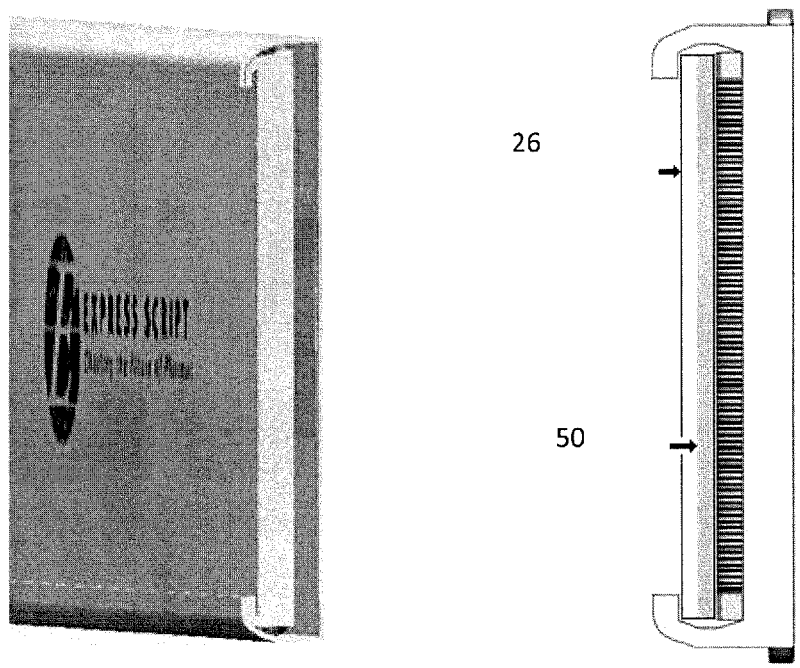
FIG. 14 shows the e-paper display having a protective barrier on top to keep the display safe from impacts and environmental damages.
Figure 15:
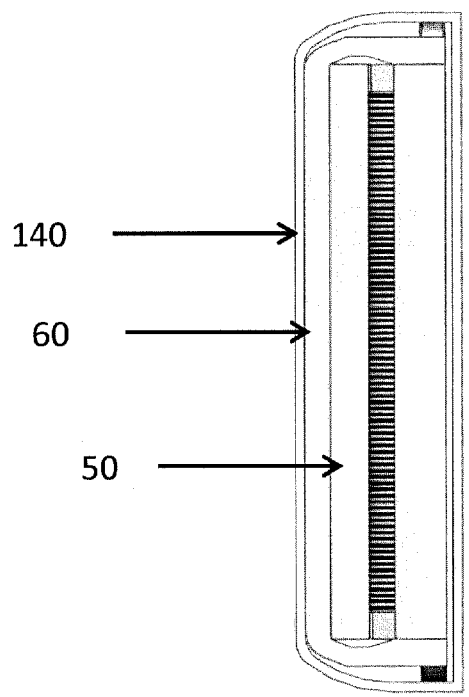
FIG. 15 shows a display with an enclosure that protects the driver along with the e-paper.

The holder 160 can be supported with a resilient material, which can apply a tension to push the driver toward the e-paper, such as foam 110. The foam can having a coating on the portion in contact with the driver, such as a thin plastic layer 112, as shown in FIG. 12, to reduce the frictional force from the driver sliding along the foam. The foam 110 pushes the e-paper to the front and makes it look aligned and nicer on the shelf by preventing it from floating inside. Since the foam 110 is very flexible, when the driver 60 moves, it pushes the foam 110 back and creates a cavity for easier movement, as shown in FIG. 13.

Figure 16:
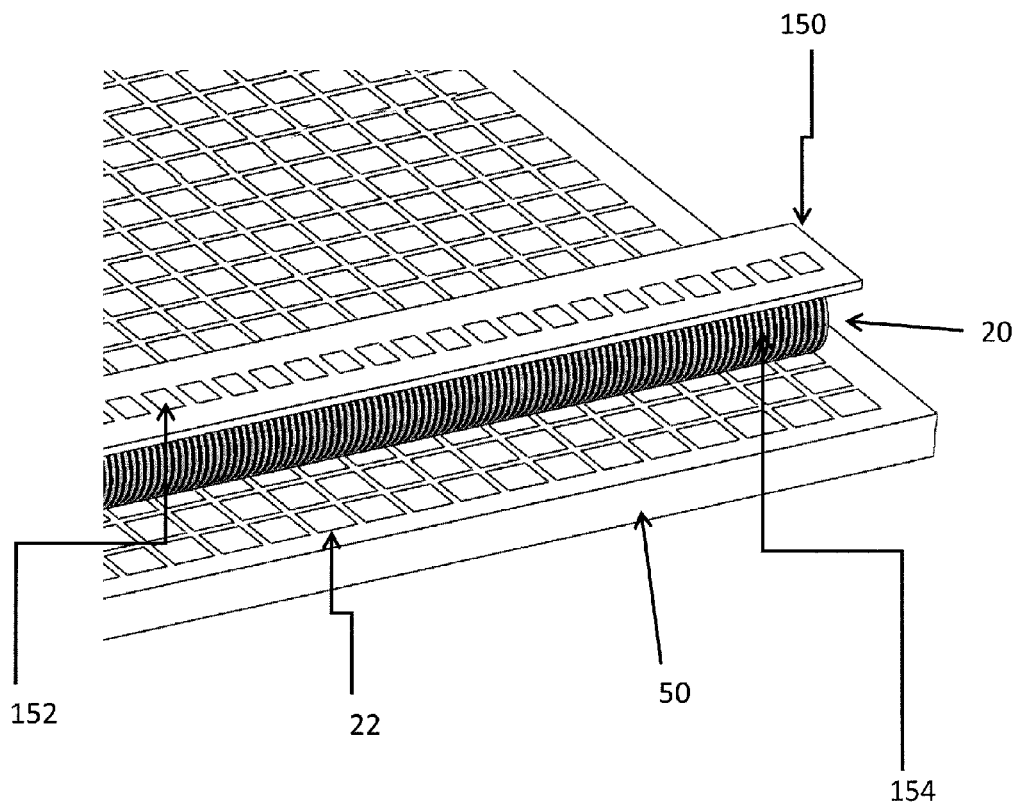
FIG. 16 shows a driver connection to a PCB board and conductive portions that can be charged by a control unit (not shown).
Figures 17, 18:
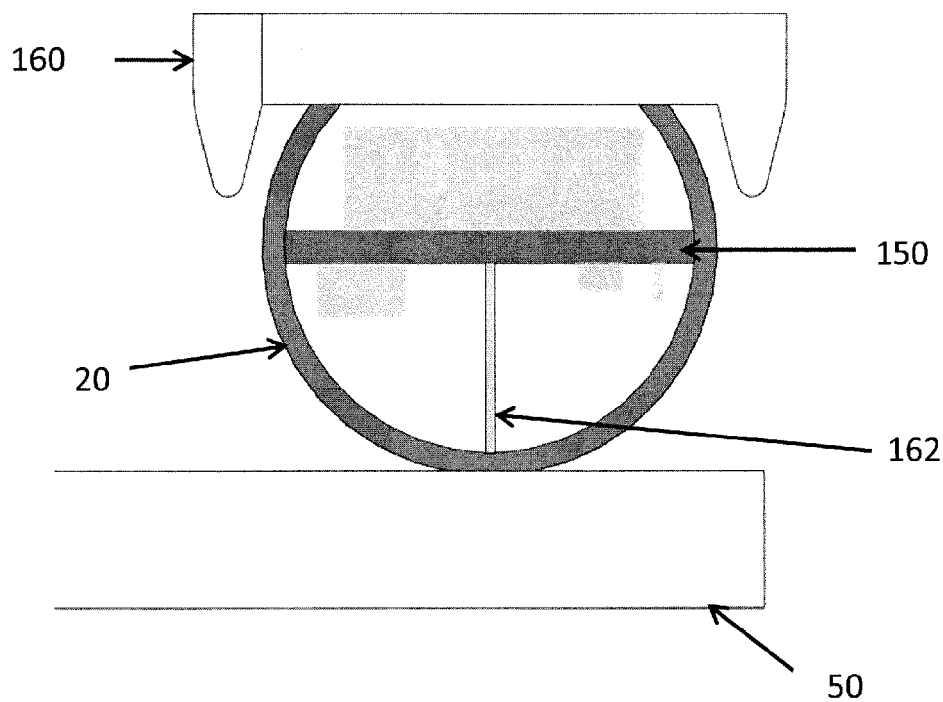
FIG. 17 shows a different connection method of a cylindrical element with a PCB using a holder and connector.
FIG. 18 shows a planer view of row and column electrodes of an e-paper display described in US20130162511, which can be incorporated with an embodiment of the invention.

FIG. 16 shows the driver 60 connection to the PCB board 150. The conductive parts, e.g., pads, on the PCB are each charged by the controller unit (e.g., charged by a transistor or directly charged by the microchip). The cylindrical contact element, or roller 20, is not wired to the PCB board 150. Instead, the conductive elements on the roller 154 touch the conductive pads 152 on the PCB, and transfer the current (or electric charge) to the conductive regions of the e-paper by the conductive elements simultaneously contacting the e-paper side. Although FIG. 17 shows the conductive regions of the e-paper in a pattern, the regions can be randomly located, or located in any desired pattern or design. In this way, the roller 20 is a passive element that can easily be replaced if needed, such as due to damage caused by the friction between the e-paper 50 and roller 20 and/or friction between the roller 20 and the PCB board 150.

In another embodiment the roller 20 can carry the driver ICs inside of the roller and the roller can be wired to the driving components, as in FIG. 17.

Figure 19:
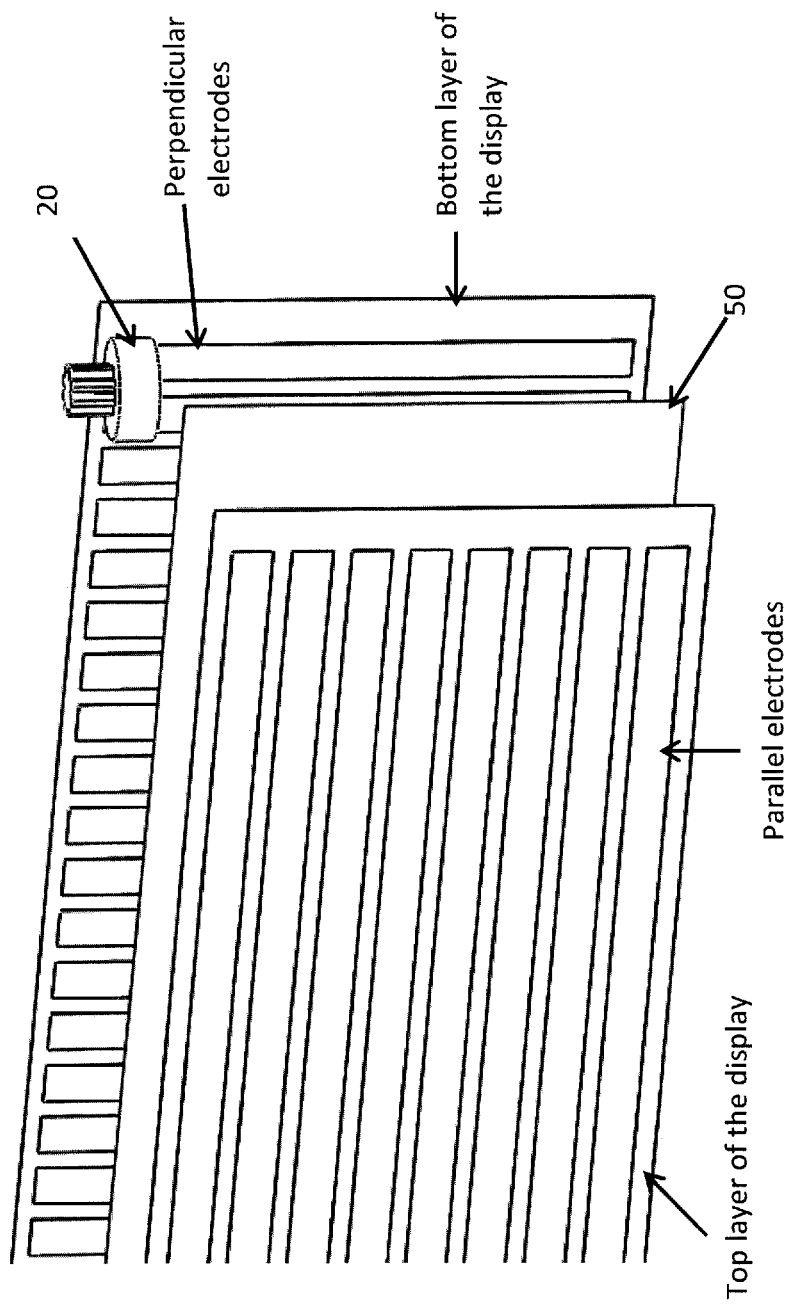
FIG. 19 shows another embodiment of a roller element.

FIG. 18 shows another type of e-paper technology that utilizes a passive matrix driving method described in US20130162511, which is hereby incorporated by reference in its entirety. As described in US20130162511, the ink layer of the e-paper is encapsulated with a top layer with column electrodes and a bottom layer with row electrodes, such that the intersecting areas of the row electrodes and the column electrodes forms the pixels of this display. An embodiment of the subject invention can utilize an electrode structure as taught in US20130162511, and shown in FIG. 18. FIG. 19 shows one embodiment using the electrode structure of FIG. 18, where the roller element moves on the edge of one side and charges the electrodes as it moves. The surface of the roller where it touches the e-paper does not have to have any pattern on it as in FIG. 9. Instead the whole surface or the portion of the surface can be made of conductive material or the roller itself (cylindrical or sphere) can be made of conductive material. This driver can be moved along the edge of either side of the e-paper as long as the moving direction is perpendicular to the electrodes. As the driver moves and charges or grounds the electrodes, the electrodes on the other layer is charged with a voltage that is either the same voltage, which keeps the color of the intersecting area (in other terms the pixels of this display) the same, or a different voltage, which causes the color of the intersecting area to change.

Referring to FIG. 19, the rolling element 20 is shown with its longitudinal axis parallel to the e-paper. In another embodiment, the roller element can be rotated 90° and roll along the top of the electrode pattern to as to contact the electrodes, which can extend to the top, have conductive extensions extending across a portion of the top (i.e., makes a 90° turn) and has a flat portion perpendicular to the vertical electrodes in FIG. 19, and the roller element 20 can roll across the top to make contact with the electrodes, preferably one at a time. A variety of devices can be used to move the roller element back and forth incorporating, for example, gear(s), belt(s), motor(s), linkage(s), and/or guiding structures. The edges of the electrode layers in FIG. 19 that are contacted by the contact element 20 can be rigid, or not as flexible as the main portion of the e-paper such that contact can be between the conductive element of roller element 20 and the electrode strips without as much force being applied.

In a specific embodiment, the roller element in FIG. 19 can be replaced with a sliding charge transfer contact element. If a sliding contact element is used the region of the e-paper where the sliding element moves can be made more rigid to reduce friction between contacting elements. Roller element 20 can have a cylinder outer shape, but can also have other shapes, can incorporate protrusions from the outer surface to contact electrode regions 22 easier or differently than a smooth surface rolling over the e-paper. A cylindrical structure provides a uniform electric field pattern when in contact with electrode regions 22. Although the embodiments taught in FIG. 7 have the drive moving along the e-paper, other embodiments can have the driver orientated at other angles to the current orientation, such as 90°.

Referring to FIG. 17, the charge source can be placed inside the roller element 20 and conduct charge to the element 20 via conductor 162. In an embodiment, the housing of element 20 can rotate with respect to the charge source such that conductor 162 sweeps the inside surface of the element 20 and in another embodiment, the charge source (e.g., PBC) rotates with the housing, eliminating relative movement between charge source electrode and roller element electrode (e.g., ring 90 or patterned 92). The electrodes 90 or 92 can pass from the inside surface of the housing to the outside surface of the housing.

Aspects of the invention, such as driving the roller element, may be described in the general context of computer-executable instructions, such as program modules, being executed by a computer. Generally, program modules include routines, programs, objects, components, data structures, etc., that perform particular tasks or implement particular abstract data types. Moreover, those skilled in the art will appreciate that the invention may be practiced with a variety of computer-system configurations, including multiprocessor systems, microprocessor-based or programmable-consumer electronics, minicomputers, mainframe computers, and the like. Any number of computer-systems and computer networks are acceptable for use with the present invention.

Specific hardware devices, programming languages, components, processes, protocols, and numerous details including operating environments and the like are set forth to provide a thorough understanding of the present invention. In other instances, structures, devices, and processes are shown in block-diagram form, rather than in detail, to avoid obscuring the present invention. But an ordinary-skilled artisan would understand that the present invention may be practiced without these specific details. Computer systems, servers, work stations, and other machines may be connected to one another across a communication medium including, for example, a network or networks.

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In an embodiment, the present invention takes the form of a computer-program product that includes computer-useable instructions embodied on one or more computer-readable media.

Computer-readable media include both volatile and non-volatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to, information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

The invention may be practiced in distributed-computing environments where tasks are performed by remote-processing devices that are linked through a communications network. In a distributed-computing environment, program modules may be located in both local and remote computer-storage media including memory storage devices. The computer-useable instructions form an interface to allow a computer to react according to a source of input. The instructions cooperate with other code segments to initiate a variety of tasks in response to data received in conjunction with the source of the received data.

The present invention may be practiced in a network environment such as a communications network. Such networks are widely used to connect various types of network elements, such as routers, servers, gateways, and so forth. Further, the invention may be practiced in a multi-network environment having various, connected public and/or private networks.

Communication between network elements may be wireless or wireline (wired). As will be appreciated by those skilled in the art, communication networks may take several different forms and may use several different communication protocols. And the present invention is not limited by the forms and communication protocols described herein.

EMBODIMENTS

Embodiment 1

An e-paper system, comprising:
an e-paper, wherein the e-paper has a plurality of electrode regions configured to independently receive charge, retain charge, and have charge removed therefrom, wherein transferring charge to and/or removing charge from one or more electrode regions of the plurality of electrode regions controls an output state of the e-paper,
a driver, wherein the driver comprises:
a control unit;
a plurality of driver contacts, wherein the control unit is configured to selectively and independently charge each driver contact of the plurality of driver contacts; and
a contact element, wherein the contact element has a plurality of conductive elements,
a mechanical driver, wherein the mechanical driver is configured to slidably move the driver with respect to the e-paper in a first direction, wherein as the driver slidably moves with respect to the e-paper, the plurality of conductive elements are changeably positioned with respect to the plurality of electrode regions of the e-paper to transfer charge to one or more of the electrode regions of the plurality of electrode regions of the e-paper based on a linear position along the e-paper with respect to the first direction.

Embodiment 2

The system according to Embodiment 1, wherein the contact element comprises a rotating element, wherein the rotating element comprises the plurality of conductive elements, wherein when the driver slidably moves with respect to the e-paper, the rotating element rotates, wherein as the rotating element rotates the plurality of conductive elements are changeably positioned with respect to the plurality of electrode regions of the e-paper to transfer charge to one or more of the electrode regions of the plurality of electrode regions of the e-paper based on a rotational position of the roller contact element and the linear position along the e-paper with respect to the first direction,
wherein at a first rotational position and a first linear position, a first subset of the conductive elements of the plurality of conductive elements of the roller contact element electrically connects a first subset of PCB contacts of the plurality of PCB contacts with a first subset of electrode regions of the plurality of electrode regions, wherein at a second rotational position and a second linear position, a second subset of the conductive elements of the plurality of conductive elements of the roller contact element electrically connects a second subset of PCB contacts of the plurality of PCB contacts with a second subset of electrode regions of the plurality of electrode regions.

Embodiment 3

The e-paper driver according to Embodiment 1, wherein the plurality of driver contacts comprises a printed circuit board, wherein the plurality of driver contacts are positioned on the printed circuit board.

Embodiment 4

An e-paper driver according to Embodiment 2, wherein the conductive regions of the rotating element are charged first and then as the rotating element rotates the rotating element charges the plurality conductive areas on the e-paper.

Embodiment 5

An e-paper driver according to Embodiment 2, wherein the rotating element comprises a cylinder with film that has consecutive conductive and non-conductive regions surrounding the surface of the cylinder.

Embodiment 6

An e-paper driver according to Embodiment 2, wherein the rotating element comprises a cylinder with consecutive conductive and non-conductive layers.

Embodiment 7

An e-paper driver according to Embodiment 5, wherein the surface of the cylindrical element has a pattern of conductive and non-conductive regions.

Embodiment 8

An e-paper driver according to Embodiment 2, wherein the conductive regions of the rotating element are coated with low friction conductive material.

Embodiment 9

An e-paper driver according to Embodiment 5, wherein the surface of the cylindrical element has only conductive regions that are spaced apart.

Embodiment 10

An e-paper driver according to Embodiment 2, wherein the rotating element comprises conductive beads lined up together with non-conductive elements in between.

Embodiment 11

The system according to Embodiment 1, further comprising:
a wiper, wherein the wiper removes charge from the plurality of electrode regions as the driver slidably moves with respect to the e-paper.

Embodiment 12

The system according to Embodiment 1, wherein the driver holds the e-paper in-between a first portion of the driver and second portion of the driver, wherein the first portion of the driver is positioned on the first side of the e-paper, wherein the plurality of electron regions are on the first side of the e-paper, wherein the second portion of the driver is positioned on a second side of the e-paper, wherein the second portion of the driver applies pressure to the second side of the e-paper to ensure a contact between the first portion of the driver and the first side of the e-paper.

Embodiment 13

The system according to Embodiment 12, wherein the first position of the driver has the plurality of conductive elements that connects the plurality of driver contacts and the plurality of electrode regions.

Embodiment 14

The system according to Embodiment 12, wherein the first portion of the driver and the second portion of the driver encircle the e-paper.

Embodiment 15

The system according to Embodiment 11, wherein the wiper is conductive and moveably attached to the driver, wherein when the wiper touches the e-paper the wiper erases an image on the e-paper.

Embodiment 16

The system according to Embodiment 1, wherein the e-paper is flexible.

Embodiment 17

The system according to Embodiment 1, wherein the system is adapted to be attached to an edge of a shelf, wherein the driver is stationary with respect to the edge of the shelf, wherein the e-paper moves along the edge of the shelf over the e-paper.

Embodiment 18

An e-paper display, comprising:
The e-paper system of claim 1.

Embodiment 19

The e-paper display according to Embodiment 18, wherein the e-paper display is configured to attach to an edge of a shelf, such that the e-paper is stationary with respect to the edge of the shelf, wherein the driver moves along the edge of the shelf over the e-paper.

Embodiment 20

A system for displaying information, comprising:
one or more e-paper displays, wherein each of the one or more e-paper displays comprises e-paper and a driver, wherein the driver writes on one or more e-papers aligned together;
a communications module, wherein the communications module provides a first signal to the driver as to what to write on the e-paper;
a command module, wherein the command module provides a second signal to the communications module, wherein the second signal provides one or more updates for the driver to write on the e-paper.

Embodiment 21

The system according to Embodiment 20, further comprising a power source.

Embodiment 22

The system according to Embodiment 20, wherein power is harvested from movement of the driver.

Embodiment 23

The system according to Embodiment 20, wherein power is harvested from ambient light.

Embodiment 24

The system according to Embodiment 21, wherein the power source is outside of the driver wherein the e-paper has contacts to connect the driver and the power source.

Embodiment 25

The system according to Embodiment 20, wherein the driver is slidably interconnected with the e-paper such that the e-paper and driver slide with respect to each other, wherein as the e-paper and driver slide with respect to each other the driver writes on the e-paper, wherein a first portion of the driver is positioned on a first side of the e-paper and a second portion of the drive is positioned on a second side of the e-paper, wherein the second side is opposite the first side.

Embodiment 26

The system according to Embodiment 20, wherein the one or more e-paper displays comprise a plurality of e-paper displays.

Embodiment 27

The system according to Embodiment 20, wherein the driver comprises:
a control unit;
a printed circuit board having a plurality of driver contacts that can be charged by the control unit;
a rotating contact element, wherein conductive elements on the rotating contact element electrically connect the plurality of driver contacts with a plurality of electrode regions on a row of e-paper surface at a first rotational position, wherein as the rotating element moves the rotating element makes electrical contact with the plurality of driver contacts on the PCB and makes contact with the plurality of electrode regions of the e-paper in at least one additional rotational position of the rotating contact element.

Embodiment 28

The system according to Embodiment 20, wherein the e-paper display is adapted to be attached to an edge of a shelf, wherein the e-paper is stationary with respect to the edge of the shelf, wherein the driver moves along the edge of the shelf over the e-paper.

Embodiment 29

The system according to Embodiment 2, wherein the printed circuit board comprises an array of thin film transistors.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

The invention claimed is:

1. An e-paper system, comprising:
   an e-paper,
   wherein the e-paper has a plurality of electrode regions configured to independently receive charge, retain charge, and have charge removed therefrom, and
   wherein transferring charge to and/or removing charge from one or more electrode regions of the plurality of electrode regions controls an output state of the e-paper;
   a driver,
   wherein the driver comprises:
      a control unit;
      a plurality of driver contacts,
      wherein the control unit is configured to selectively and independently charge each driver contact of the plurality of driver contacts; and
      a contact element,
      wherein the contact element has a plurality of conductive elements,
   a mechanical driver,
   wherein the mechanical driver is configured to slidably move the driver with respect to the e-paper in a first direction, and
   wherein as the driver slidably moves with respect to the e-paper, the plurality of conductive elements are changeably positioned with respect to the plurality of electrode regions of the e-paper to transfer charge to or remove charge from one or more of the electrode regions of the plurality of electrode regions of the e-paper based on a linear position along the e-paper with respect to the first direction.

2. The system according to claim 1,
   wherein the contact element comprises:
      a rotating element,
      wherein the rotating element comprises the plurality of conductive elements,
   wherein when the driver slidably moves with respect to the e-paper, the rotating element rotates,
   wherein as the rotating element rotates the plurality of conductive elements are changeably positioned with respect to the plurality of electrode regions of the e-paper to transfer charge to or remove charge from one or more of the electrode regions of the plurality of electrode regions of the e-paper based on a rotational position of the rotating element and the linear position along the e-paper with respect to the first direction,
   wherein at a first rotational position and a first linear position, a first subset of the conductive elements of the plurality of conductive elements of the rotating element electrically connects a first subset of driver contacts of the plurality of driver contacts with a first subset of electrode regions of the plurality of electrode regions, and
   wherein at a second rotational position and a second linear position, a second subset of the conductive elements of the plurality of conductive elements of the rotating element electrically connects a second subset of driver contacts of the plurality of driver contacts with a second subset of electrode regions of the plurality of electrode regions.

3. The system according to claim 2,
   wherein the rotating element comprises a cylinder with consecutive conductive and non-conductive layers.

4. The system according to claim 2,
   wherein the conductive regions of the rotating element are coated with low friction conductive material.

5. The system according to claim 2,
   wherein the rotating element comprises conductive beads lined up together with non-conductive elements in between.

6. The system according to claim 2,
   wherein the plurality of driver contacts comprises:
      an array of thin film transistors.

7. The system according to claim 1,
   wherein the plurality of driver contacts comprises:
      a printed circuit board,
      wherein the plurality of driver contacts are positioned on the printed circuit board.

8. The system according to claim 1, further comprising:
   a wiper,
   wherein the wiper removes charge from the plurality of electrode regions as the driver slidably moves with respect to the e-paper.

9. The system according to claim 8,
   wherein the wiper is conductive and moveably attached to the driver, and
   wherein when the wiper touches the e-paper the wiper erases an image on the e-paper.

10. The system according to claim 1,
    wherein the driver holds the e-paper in-between a first portion of the driver and second portion of the driver,
    wherein the first portion of the driver is positioned on a first side of the e-paper,
    wherein the plurality of electrode regions are on the first side of the e-paper,
    wherein the second portion of the driver is positioned on a second side of the e-paper, and wherein the second portion of the driver applies pressure to the second side of the e-paper to ensure a contact between the first portion of the driver and the first side of the e-paper.

11. The system according to claim 10,
wherein the first portion of the driver has the plurality of conductive elements that connects the plurality of driver contacts and the plurality of electrode regions.

12. The system according to claim 10,
wherein the first portion of the driver and the second portion of the driver encircle the e-paper.

13. The system according to claim 1,
wherein the e-paper is flexible.

14. The system according to claim 1,
wherein the system is adapted to be attached to an edge of a shelf, such that:
the driver is stationary with respect to the edge of the shelf, and
the e-paper moves along the edge of the shelf over the e-paper.

15. An e-paper display, comprising:
the e-paper system of claim 1.

16. The system according to claim 1,
wherein the contact element comprises:
a rotating element,
wherein the rotating element comprises the plurality of conductive elements,
wherein when the driver slidably moves with respect to the e-paper, the rotating element rotates,
wherein as the rotating element rotates the plurality of conductive elements are changeably positioned with respect to the plurality of electrode regions of the e-paper to transfer charge to or remove charge from one or more of the electrode regions of the plurality of electrode regions of the e-paper based on a rotational position of the rotating element and the linear position along the e-paper with respect to the first direction,
wherein at a first rotational position and a first linear position, a subset of the conductive elements of the plurality of conductive elements of the rotating element electrically connects with a subset of driver contacts of the plurality of driver contacts such that the subset of driver contacts of the plurality of driver contacts transfers charge to or receives charge from the subset of the conductive elements of the plurality of conductive elements, and
wherein at a second rotational position and a second linear position, the subset of the conductive elements of the plurality of conductive elements of the rotating element electrically connects with a subset of electrode regions of the plurality of electrode regions such that the subset of the conductive elements of the plurality of conductive elements transfers charge to or receives charge from the subset of electrode regions of the plurality of electrode regions.

17. The system according to claim 16,
wherein the rotating element comprises a cylinder with film that has consecutive conductive and non-conductive regions surrounding the surface of the cylinder.

18. The system according to claim 17,
wherein the surface of the cylindrical element has a pattern of conductive and non-conductive regions.

19. The system according to claim 17,
wherein the surface of the cylindrical element has only conductive regions that are spaced apart.

20. A system for displaying information, comprising:
one or more e-paper displays,
wherein each of the one or more e-paper displays comprises:
e-paper; and
a driver,
wherein the driver writes on two or more e-papers aligned together;
a communications module, and
wherein the communications module provides a first signal to the driver as to what to write on the two or more e-papers; and
a command module,
wherein the command module provides a second signal to the communications module, and
wherein the second signal provides one or more updates for the driver to write on the two or more e-papers.

* * * * *